Dec. 25, 1962 J. DAVIDSE 3,070,653

COLOR RECEIVER CROSS-TALK MINIMIZING

Filed March 26, 1959 2 Sheets-Sheet 1

INVENTOR

JAN DAVIDSE

BY Frank R. Jifari

AGENT

INVENTOR
JAN DAVIDSE
BY Frank R. Jerfari
AGENT

United States Patent Office 3,070,653

Patented Dec. 25, 1962

3,070,653

COLOR RECEIVER CROSS-TALK MINIMIZING

Jan Davidse, Eindhoven, Netherlands, assignor to North American Philips Company, Inc., New York, N.Y., a corporation of Delaware Filed Mar. 26, 1959, Ser. No. 802,167
Claims priority, application Netherlands May 1, 1958
5 Claims. (Cl. 178—5.4)

This invention relates to transmission systems for colour television in which the transmitted signal contains a component substantially relating to the brightness of a scene and at least one component comprising an auxiliary carrier having modulated on it one or more signals relating to the colour content of the scene, the frequency band of the last-mentioned component being coincident with part of the first-mentioned component, and a suppression filter for partial suppression of the second component being included in a receiver for the system in the channel for the first component.

In a known system, the first-mentioned component, the luminance signal, comprises a combination of three signals relating to the green light components, the red light components and the blue light components, respectively, of a scene.

The second component comprises an auxiliary carrier having modulated on it in quadrature two signals which are likewise combinations of the three signals relating to the green, red and blue light components of the scene, which combinations are relatively different, however, and also differ from the combination constituting the luminance signal.

Receivers for the system above described operate as follows:

After possible detection, if the transmission has taken place by wireless means, the luminance signal and the auxiliary carrier modulated in quadrature are available in the receiver. By means of a process usually referred to as synchronous detection, the two combinations differing from the luminance signal are derived from the said modulated auxiliary-carrier. Finally, the three colour signals to be supplied to the reproducing device are derived from the said two combinations and the luminance signal.

The two said components are fundamentally chosen so that variations in the colour of the scene to be reproduced, without variations in brightness occurring, do not result in variations in the first-mentioned component, and that the last-mentioned is zero if the scene to be reproduced is white or grey. However, this really applies only to linear systems. In practice, the signals from which the components are built up are gamma-corrected, this in view of the non-linearity of the reproducing device.

However, a consequence thereof is in practice that in the case of a colour transition in the scene which is not attended with a variation in the brightness of the scene, a variation in brightness nevertheless occurs in the image reproduced and this may have a greatly interfering effect more particularly for transitions between saturated colours.

An object of the invention is to mitigate this disadvantage and, for this purpose, the system according to the invention is characterized in that of the component made active in the reproducting device of a receiver of the system, which component substantially relates to the brightness of the scene, at least the lower frequencies which do not fall within the frequency range occupied by the second component, are delayed with respect to the second component, and that this delay is compensated again in the signals made active in the reproducing device of the receiver and which are derived from the second component.

In order that the invention may be readily carried into effect, it will now be described in detail, by way of example, with reference to the accompanying drawings, in which.

As previously mentioned in the preamble, in the case of transitions between two colour sections of a scene to be reproduced, variations in brightness occur in the image reproduced which are not connected with the actual variations in brightness of the scene, but which are attributable to the non-linear distortion of the signals from which the two transmitted components are built up, as a result of the gamma correction. Thus, in the case of a transition between two complementary colours, it is found that during this transition the brightness in the image reproduced is less than the brightness should actually be.

Figure 1:
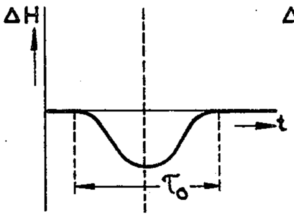
FIGS. 1, 2 and 3 show undesirable variations in brightness during reproduction which occur in practice in a system to which the invention relates.

This situation is illustrated in FIG. 1. Plotted as a function of time $t$ is the brightness variation $\Delta H$ during the transition, the position of which is indicated in the figure by a vertical dashed line. The period $\tau_0$ during which the effect occurs is approximately equal to the rising time of the filters determining the band-width, which are present in the total transmission channel for the signals modulated on the auxiliary carrier. These may be the filters in the receiver from the output of which the demodulation products of the second component are derived, but they may as well be the filters in the transmitter through which the combinations previously mentioned are supplied to the modulators. (From this it otherwise follows that the effect is essentially limited to the lower frequencies of the luminance signal). If such filters have different band-widths, this in view of the different band-width of the two signals modulated in quadrature on the auxiliary carrier, the phenomenon is actually more complicated, but the image of the brightness variation then occurring does not essentially differ from that shown in FIG. 1.

Figure 2:
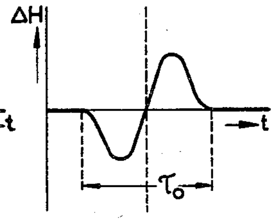
Figure 3:
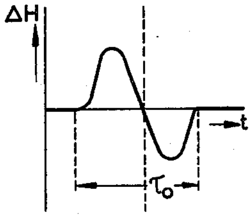

FIG. 2 shows in a similar manner the case in which the transition is from a coloured section to white and in FIG. 3 the case in which the transition is from white to a coloured section. The effects are naturally stronger as the colours considered are more saturated.

Figure 4:
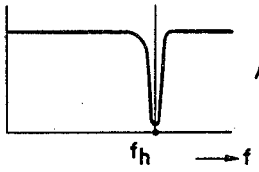
FIG. 4 shows the response characteristic of a suppression filter used in such a system in the channel for the first component of the receiver of the system for the purpose of suppressing the second component.

The invention underlies the following. The signals to be supplied to the reproducing device are obtained by combination of the first component, the luminance signal, and the two signals derived from the second component by demodulation. However, the second component, a modulated auxiliary carrier, is still present in the luminance signal. True, the frequency of the auxiliary carrier has been chosen in practice so that the interfering influence of the second component upon the first component is a minimum, but it still appears necessary to include a filter in the channel of this component for suppressing the second component. The band-width of the suppression filter is chosen so that an acceptable compromise is obtained between the visibility of the modulated auxiliary carrier in the image reproduced and the loss of high frequencies in the luminance signal which also occurs as a logical consequence of this suppression, which loss detrimentally affects the definition of reproduction. In view of the last-mentioned phenomenon, the modulated auxiliary carrier is therefore never suppressed completely in practice. The suppression is substantially complete only for the frequency of the auxiliary carrier, whilst the side-bands are suppressed only for a small part. FIG. 4 shows the band-pass characteristic of such a filter. $f_h$ indicates the frequency of the auxiliary carrier.

Figure 5:
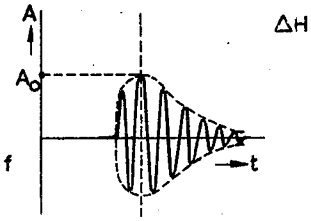
FIG. 5 shows the remaining part of the second component at the output of such a filter with a colour transition in the scene to be reproduced.

It will be evident that the side-band frequencies occur to a great extent precisely during transitions in colour. If a sharp transition in colour occurs in a scene, the shape of the modulated auxiliary carrier, after having passed through a filter having a band-pass characteristic as shown in FIG. 4, is found to be as shown in FIG. 5. As a matter of fact, this shape is different for different colour transitions, but the different shapes all correspond to a greater or lesser extent to that shown in FIG. 5. Similarly as in FIGS. 1, 2 and 3, the vertical dashed line indicates the area of the transition. The height $A_0$ and the length of the signal occurring at the right of the transition increase as the band-width of the filter is smaller.

Now, the reproducing device used in television shows a non-linear reproduction characteristic. In order to decrease the influence thereof upon reproduction, the above-mentioned gamma-correction is applied to the signals from which the two components are built up.

Figure 6:
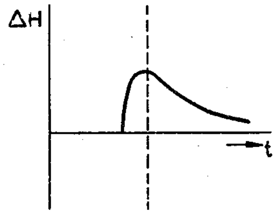
FIG. 6 shows the variation in brightness brought about in the image reproduced by the said remaining part of the second component.

The same non-linearity of the reproduction characteristic causes the reproducing device to exert a rectifying action upon the modulated auxiliary carrier which is supplied to the reproducing device and not removed completely from the luminance signal and hence upon the signal shown in FIG. 5. This effect results, during transition, in an increase in the brightness of the image reproduced, which increase in brightness is, of course, undesirable and has the shape shown in FIG. 6.

Considering now the unwanted variations in brightness which are attributable to a non-linear distortion of the component parts of the two components, and those which are attributable to the rectifying properties of the reproducing device upon the part of the second component remaining in the luminance signal, it will be found that the first-mentioned effect (FIGS. 1, 2 and 3) always exhibits a great extent of symmetry with respect to the transition area, but that the second effect (FIG. 6) is asymmetric with respect to this area.

According to the invention, by delaying the first component in a suitable manner with respect to the second component before making the first component active in the reproducing device, the interfering influence of the first-mentioned effect upon the brightness of the image reproduced may be considerably reduced by the likewise interfering influence of the second effect upon this brightness.

Figure 7:
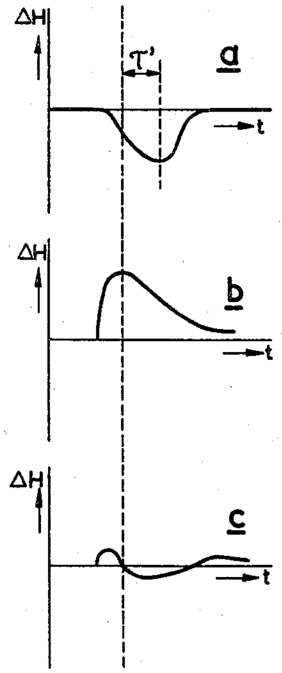
FIGS. 7, 8 and 9 show curves which serve to clarify the invention.

In order to clarify this, reference is made to FIG. 7. Plotted at *a*, as a function of time, is the first effect delayed by the time $\tau'$, such as occurs with a colour transition between two complementary colours. The second effect is plotted, as a function of time, at *b* and the resulting effect at *c*. The residual error has a materially smaller amplitude and hence is much less interfering.

Figure 8:
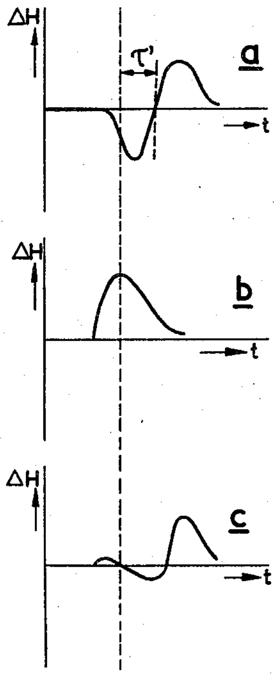
Figure 9:
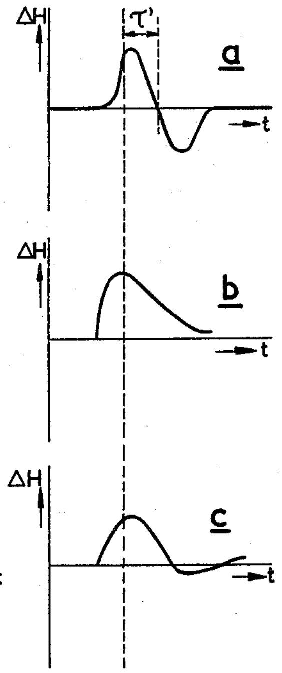

It will be noted that during the transition from a colour to white (FIG. 2) the compensation is partial only (FIG. 8) similarly as with the transition from white to a colour (FIG. 9), and that the interfering effects continue to intensify each other in part during certain moments. Now, such intensifications which, at any rate, are less than if the said delay does not occur and which bring about positive brightness variations in the image reproduced, precisely occur in white where such positive variations in brightness are least perceptible. It will otherwise be evident that the effects illustrated in FIGS. 8 and 9 are considerably less than that shown in FIG. 7.

A value for $\tau'$ which is satisfactory in practice is found to be approximately equal to half the rising time of the filters determining the band-width, which filters are included in the total transmission channel for the signals modulated on the auxiliary carrier. If these filters are of the order of magnitude of 1 mc./s., the rising time is approximately 0.4 $\mu$sec., so that $\tau'$ may be approximately 0.2 $\mu$sec.

A method of realizing such compensation consists in introducing into the transmitter of the system a delay $\tau'$ for the luminance signal with respect to the modulated auxiliary carrier and in reducing by $\tau'$ in the receiver the delay of the luminance signal which is applied in order to compensate for the delays in the output signals of the filters included in the outputs of the synchronous detectors. Apart from the said variations in the delay times, a transmitter and receiver of the known system need not be modified at all for the use of the invention.

Now, it will preferably be avoided in practice, for systems already in existence, to introduce changes in the system of the transmitter in order to avoid difficulties with receivers already in existence.

However, it is also possible to limit the variations in system according to the invention to the receiving end only, so that it is possible to cause a receiver showing the improvement in quality of the reproduced image as envisaged by the invention to co-operate with transmitters of the existing system.

Figure 10:
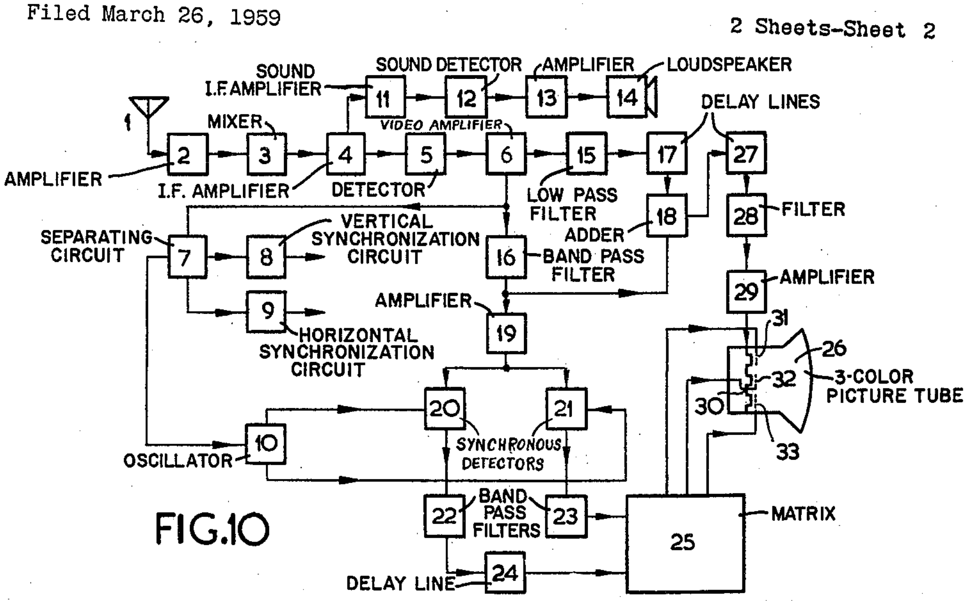
FIGS. 10 and 11 show embodiments of receivers for a system according to the invention.

FIG. 10 shows, very diagrammatically, a simplified embodiment of such a receiver. 1 indicates therein a suitable aerial system for the reception of a carrier wave having the two said components modulated on it. In addition, a second carrier wave is received on which an acoustic signal is modulated in frequency or in amplitude. The aerial system 1 is coupled to a high-frequency amplifier 2 and a mixing stage 3. The output signal of 3 is supplied to an intermediate-frequency amplifier 4 which is coupled to a detector 5 and a video-amplifier 6.

The carrier wave on which the acoustic signal is modulated may be separated from the television signal either in the intermediate-frequency stage 4 or in the detector 5 dependent upon whether use is made of the intercarrier principle or not, and supplied to an intermediate-frequency stage 11 which in turn is coupled to a sound detector 12. The output signal of 12 is supplied via a low-frequency amplifier 13 to one or more loudspeakers 14. In FIG. 10, the audio-frequency carrier is separated from the television signal in the intermediate-frequency stage 4.

The television signal transmitted also contains the required synchronizing signals both for the saw-tooth generators for the horizontal and vertical deflections and for the oscillator producing the voltages required for synchronous detection. The various synchronizing signals are restored from the output signal of video-amplifier 6 in a separating circuit 7.

The synchronizing pulses for the vertical deflection are supplied to a device 8 for synchronization of the saw-tooth generator which constitutes part thereof. The output currents of 8 are supplied to the vertical deflection coils of the picture tube (not shown).

The synchronizing pulses for the horizontal deflection are supplied to a device 9 for synchronization of the saw-tooth generator which constitutes part thereof. The output currents of 9 are supplied to the horizontal deflection coils of the picture tube (likewise not shown).

The devices 8 and 9 also contain the flywheel circuits, if required, whilst a direct voltage serving as a high tension for the picture tube may be obtained from the device 9 in known manner via the fly-back of the line sawtooth generator.

The synchronizing signals for the synchronous detection are supplied to the oscillator 10, at the output of which two voltages occur which have the same frequency, but are relatively shifted in phase by 90°.

The output signal of video-amplifier 6 is also supplied, on the one hand, to a low-pass filter 15 so that of the first component only the lower frequencies which do not fall within the frequency range occupied by the second component occur at the output of this filter, and supplied on the other hand, to a band-pass filter 16 which passes only the second component (naturally apart from the frequencies of the luminance signal located in the frequency range of the second component).

17 indicates a delay line which not only compensates for the delays introduced by the filters 15 and 16 into the signal parts of the output signal of video-amplifier 6, but which also provides an additional corresponding to $\tau'$ of the output signal of 15, the lower frequencies of the luminance signal, with respect to the output signal of 16, the second component.

The delayed lower frequencies of the luminance signal are recombined in an adding device 18 with the output signal of band-pass filter 16, of which the higher frequencies of the luminance signal present therein serve to supplement the parts of the luminance signal which lack in the output signal of 17. The second component also present, which is now anticipated with respect to the lower frequencies, is essentially only an interference of the luminance signal.

The output signal of band-pass filter 16 is also supplied to an amplifier 19, the output signal of which is supplied to two synchronous detectors 20 and 21, each of which has also supplied to it an output signal of the device 10. The output signals of the synchronous detectors (usually indicated as the I-signal and the Q-signal, respectively) are supplied to band-pass filters 22 and 23 respectively. The band-pass filters may have different band-widths in practice. It is assumed that the band-pass filter 22 (for the I-signal) passes a broader band than does the band-pass filter 23 (for the Q-signal). This implies that the output signal of 22 is delayed to a greater extent than the output signal of 23. The delay line 24 in the output circuit of the band-pass filter 22 compensates for this difference in delay.

The output signals of 23 and 24 are supplied to a matrix network 25 which produces three so-called colour difference signals from said output signals. A colour difference signal is a signal which, when added to the luminance signal, provides a signal which relates to a given colour component of the scene to be reproduced.

The combination with the luminance signal is effected in the example chosen, in the picture tube 26 itself. However, before this combination takes place, said signals must undergo a similar delay as have the frequencies (in this case lower) of the luminance signal in order to compensate for the additional delay which the last-mentioned signal has undergone. Now, the situation is such that, if the luminance signal had not undergone the additional delay $\tau'$, it would have to undergo a fairly considerable delay $\tau''$ with respect to the output signal of the filter 23 (the signal Q).

In the receiver shown in FIG. 10, the luminance signal set up at the output of the adding device 18 already shows a delay $\tau'$ with respect to said signal of the filter 23. Instead of delaying the luminance signal $\tau''$ and each of the output signals of the materix 25 by $\tau'$, it suffices to delay the output signal of 18 by $\tau''-\tau'$.

To this end, the output signal of 18 is supplied to a delay line 27.

The output signal of 27 is subsequently supplied to a suppression filter 28, the response characteristic of which is shown in FIG. 4.

After subsequently being amplified in an amplifier 29, the luminance signal is supplied with negative polarity to three through-connected cathodes 30 of the three-colour tube 26 equipped with three electron guns.

By also supplying the output signals of the matrix 25 to three control grids 31, 32, 33, which are not through-connected, the electron beams produced by the three electron guns each have modulated on them the sum of the luminance signal and a color difference signal.

It will be noticed that in the luminance signal supplied to the picture tube in the above-described manner the higher frequencies are reproduced likewise anticipated by a time $\tau'$ with respect to the lower frequencies of the luminance signal. However, in practice, the effect resulting therefrom is substantially imperceptible.

A similar result as that with the receiver shown in FIG. 10 may be obtained with a receiver in which the additional delay of the lower frequencies of the luminance signal is brought about by designing part of the channel for the first component, for example the intermediate-frequency amplifier or the video-amplifier, so that the group transit-time for the said lower frequencies of the luminance signal is greater than for the higher frequencies of the luminance signal which also contain the second component. As a matter of fact, in this case also, it is necessary to ensure that in the signals supplied to the reproducing device of the receiver, which are derived from the second component, the additional delay thus brought about for the said lower frequencies of the luminance signal is compensated again.

Figure 11:
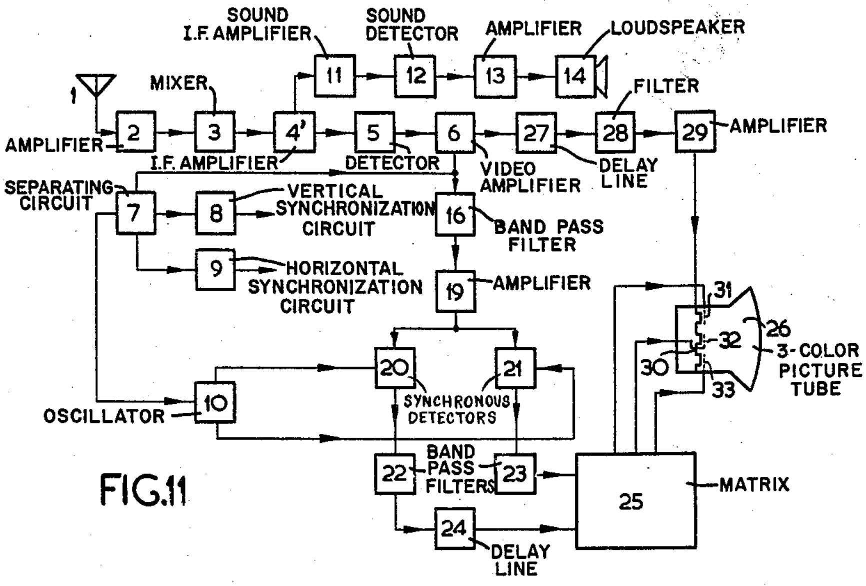

FIG. 11 shows the block diagram of the receiver in which this method is used, that is to say, in the intermediate-frequency stage.

Corresponding parts of the receivers shown in FIGS. 10 and 11 are indicated by the same reference numerals.

Figure 12:
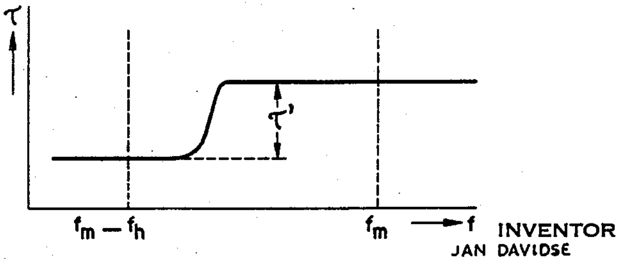
FIG. 12 shows a characteristic curve relating to the receiver of FIG. 11.

The intermediate-frequency stage 4' of the receiver has a group transit-time characteristic as shown in FIG. 12, in which the relay $\tau$ brought about by this stage is plotted as a function of frequency. The difference between the delay for the lower frequencies of the luminance signal, which in this stage is still modulated on the intermediate-frequency carrier having a frequency $f_m$, and that for the higher frequencies of the signal is chosen to be equal to $\tau'$.

The output signal of video-amplifier 6 may now readily be supplied to the delay line 27 by which the signal is delayed by a time $\tau''-\tau'$. Therein $\tau''$ has the same significance as above and hence represents the delay which the luminance signal would have to undergo if the lower frequencies thereof were not delayed with respect to the second component.

It will be evident that the invention is not limited to the receivers shown in the embodiments. The combination of the colour difference signals with the luminance signal, for example, need not take place in the picture tube itself, but may alternatively take place, for example, in the matrix device 25. The manner in which the colour difference signals are produced may also be completely different, for example the three colour difference signals may be derived immediately from the second component by means of three synchronous detectors. The signals ultimately obtained, which each relate to a given colour component of the scene to be reproduced, may be converted in a suitable manner into a signal which is suitable for a three colour tube having only one electron gun, etc.

In the foregoing, it has always been assumed that only one modulated carrier lies in the luminance signal. It will be evident that, if a further modulated auxiliary carrier is present in the luminance signal, a similar procedure may be followed for this auxiliary carrier.

What is claimed is:

1. A receiver for color television signals having a first component substantially relating to the brightness of a scene and a second component comprising an auxiliary carrier modulated with one or more signals relating to the color content of said scene, the frequency band of said second component being coincident with the higher frequency band part of said first component, said receiver comprising a channel for said first component, said channel comprising means for partially suppressing said second component, means delaying the lower frequency band part of said first component with respect to the higher frequency band part of said first component, and image reproducing means, the delay of said lower frequency band being such that signal excursions resulting from the transition of signals derived from said second component and operative in said image reproducing means are substantially compensated by signal excursions produced in said image reproducing means resulting from the remaining second component in the output signal of said means for partially suppressing said second component.

2. The receiver of claim 1, comprising band-pass filter means for determining the bandwidth of said color television signals, said delay time being approximately equal to one-half of the rise time of said band-pass filter means.

3. A receiver for color television signals having a first component substantially relating to the brightness of a scene and a second component comprising an auxiliary carrier modulated with one or more signals relating to the color content of said scene, the frequency band of said second component being coincident with the higher frequency band part of said first component, said receiver comprising a channel for said first component, said channel comprising low-pass filter means suppressing said second component, band-pass filter means for passing signals of said higher frequency band, means applying said color television signals to said low-pass filter means and said band-pass filter means, means connected to said low-pass filter means for delaying the output thereof with respect to the output of said band-pass filter means, means combining the outputs of said band-pass filter means and delay means, image reproducing means, and means applying said combined output signals to said image reproducing means, the delay of said delay means being such that signal excursions resulting from transition of signals derived from said second component and operative in said image reproducing means are substantially compensated by signal excursions produced in said image reproducing means resulting from the remaining second component in the output signal of said low-pass filter means.

4. A receiver for color television signals having a first component substantially relating to the brightness of a scene and a second component comprising an auxiliary carrier modulated with one or more signals relating to the color content of said scene, the frequency band of said second component being coincident with the higher frequency band part of said first component, said receiver comprising a first channel for said first component and a second channel for said second component, means applying said color television signals to said first and second channels, said first channel comprising means for partially suppressing signals of said second component, first delay means for delaying the lower frequency band part of said first component with respect to the higher frequency band part thereof, said second channel comprising demodulation means, image reproducing means, means applying the output of said second channel to said image reproducing means, and second delay means applying the output of said first channel to said image reproducing means, the delay of said first delay means being such that signal excursions resulting from the transition of signals derived from said second component and operative at said image reproducing means are substantially compensated by signal excursions produced in said image reproducing means resulting from the remaining second component in the output signal of said means for partially suppressing signals of said second component.

5. A receiver for color television signals having a first component substantially relating to the brightness of a scene and a second component comprising an auxiliary carrier modulated with one or more signals relating to the color content of said scene, the frequency band of said second component being coincident with the higher frequency band part of said first component, said receiver comprising a first channel for said first component and a second channel for said second component, means applying said color television signals to said first and second channels, said first channel comprising low-pass filter means for suppressing said second component, band-pass filter means for passing signals of said higher frequency band, first delay means for delaying the output of said low-pass filter means with respect to the output of said band-pass filter means, means combining the outputs of said band-pass filter means and said first delay means, said second channel comprising demodulation means, image reproducing means, means applying the output of said second channel to said image reproducing means, and second delay means applying the output of said first channel to said image reproducing means, the delay of said first delay means being such that signal excursions resulting from the transition of signals derived from said second component and operative at said image reproducing means are substantially compensated by signal excursions produced in said image reproducing means resulting from the remaining second component in the output signal of said low-pass filter means.

References Cited in the file of this patent

UNITED STATES PATENTS

| | | |
|---|---|---|
| 2,853,548 | Espenlaub | Sept. 23, 1958 |
| 2,921,121 | Grundman et al. | Jan. 12, 1960 |
| 2,924,651 | Loughlin | Feb. 9, 1960 |